I. M. NOBLE AND W. E. GOSSLING.
STORAGE BATTERY.
APPLICATION FILED JULY 23, 1919.
1,364,299.
Patented Jan. 4, 1921.
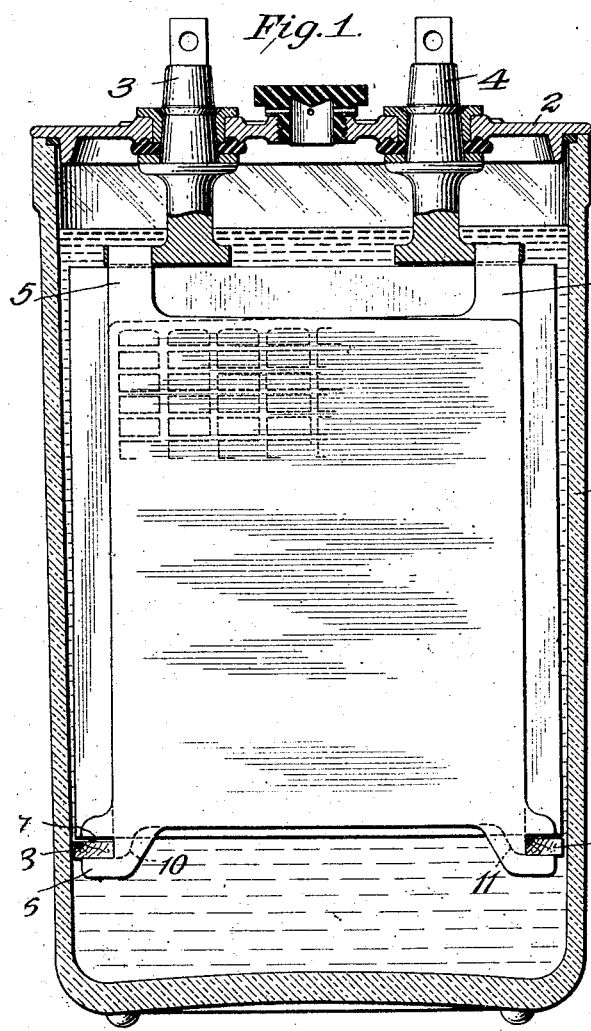
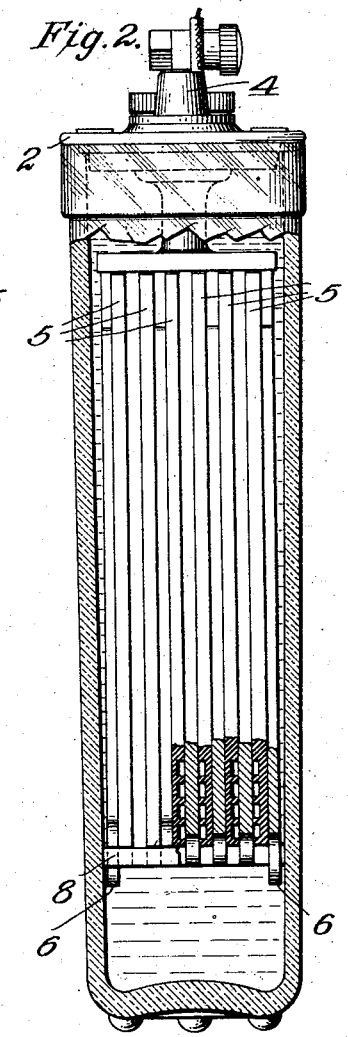
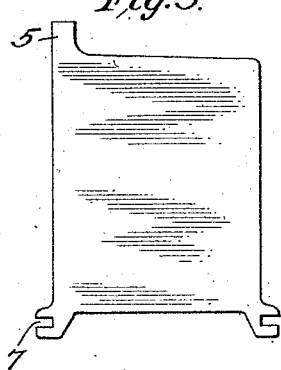
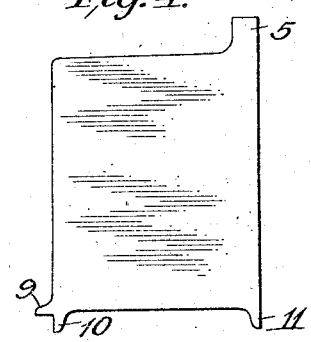
Inventors
Irving M. Noble and
Walter E. Gossling
by Kerr, Page, Cooper & Hayward, Attorneys

UNITED STATES PATENT OFFICE.

IRVINE M. NOBLE AND WALTER E. GOSSLING, OF INDIANAPOLIS, INDIANA, ASSIGNORS TO PREST-O-LITE COMPANY, INC., A CORPORATION OF NEW YORK.

STORAGE BATTERY.

1,364,299.    Specification of Letters Patent.    Patented Jan. 4, 1921.

Application filed July 23, 1919. Serial No. 312,829.

*To all whom it may concern:*

Be it known that we, IRVINE M. NOBLE and WALTER E. GOSSLING, both citizens of the United States, residing at Indianapolis, in the county of Marion and State of Indiana, have invented certain new and useful Improvements in Storage Batteries, of which the following is a full, clear, and exact description.

This invention is an improvement in storage batteries applicable generally to such devices, but more especially designed for use with batteries intended for isolated plants, such as house lighting. The chief objects of the improvement are to produce a more compact battery in which the plates are not subject to any displacement, such as fanning, and this we accomplish by the construction that may be described in general terms as follows:

The outside, which are usually the negative plates of a group or series of battery elements, are formed or provided at their lower corners with projections or extensions containing horizontal recesses or open slots. In these slots and spanning the said outside plates are forced insulating strips or flat bars, preferably of wood, which have the two-fold purpose of preventing lateral displacement of the group of elements, and also of forming stops against which projections at the corners of the intermediate plates diagonally opposite the supporting posts at the top may rest and thereby prevent said plates from fanning.

The details and specific nature of the improvement will be more fully set forth by reference to the accompanying drawings, in which—

Figure 1 is a vertical section of a battery embodying the invention.

Fig. 2 is a vertical cross section of the same at right angles to Fig. 1.

Fig. 3 is a detail view in elevation of one of the outside plates; and,

Fig. 4 is a similar view of one of the intermediate plates.

The jar for containing the battery elements is indicated by the numeral 1, the cover by 2, and the positive and negative terminal posts and upper plate supports by 3 and 4. The plates have ears 5 at one upper corner which, in the usual and well known manner, are connected with and supported by the posts 3 and 4 as shown.

The outside negative plates at their lower corners are formed with downwardly and laterally extending ears or projections 6 with horizontal recesses or open slots 7 therein, and into these slots are inserted and preferably secured in any proper manner cross bars or flat strips 8 of insulating material, preferably wood, which are wider than the depth of the slots so as to project out beyond the ears 6 as shown.

The width of the plates and dimensions of the strips 6 are so determined with reference to size of the cell that when the elements are in place the strips will contact or lie in very close proximity with the walls of the jar and so prevent lateral displacement of the outside plates.

Each intermediate plate, whether positive or negative, is suspended from its appropriate post by an ear 5 at one corner. The diagonally opposite corner at the bottom is formed with a lateral extension 9 and a depending projection 10 with their edges at right angles, and the plates are of such dimensions that these projections are in contact with and rest upon the cross bars 8, so that each of said plates has two points of support at diagonally opposite corners which support them vertically.

Each intermediate plate at its other lower corner has a projection 11 the outer edge of which is a prolongation of the plate and when in position these projections pass down over the inner side edges of the cross strips 8 whereby two lateral supports at the lower edge of each plate are afforded and any tendency to fanning is entirely prevented.

The separators rest upon the cross bars of insulating material and the construction and arrangement is such that there can be no short circuiting of plates by falling or accumulated material, and no injury to either the elements or the jars due to shocks or rough handling.

What we claim as our invention is—

1. The combination in a storage battery with the outside or negative plates of the group of elements, formed with downwardly and laterally extended projections having horizontal recesses therein, of insulating bridge strips inserted in the slots in said projections, and extending beyond the said projections substantially in contact with the walls of the battery cell, and intermediate plates having projections at their lower corners which at the corner diagonally opposite to the post support engage the top and inner side edge of a bridge strip, and at the other corner engage the inner side edge of the other strip.

2. The combination in a storage battery with the outside plates of the group of elements formed with downwardly and laterally extending projections having horizontal recesses or open slots therein, of insulating strips inserted in said slots and extending beyond the said projections into substantial contact with the walls of the cell, of intermediate plates supported at one corner by their respective terminal posts, and having their lower corners under said supports in contact with the inner side edge of an insulating strip, and their opposite lower corners resting on and against the other insulated strip.

3. The combination in a storage battery with the outside negative plates of the group of elements formed at their lower corners with downwardly and laterally extending projections having horizontal open slots therein, of insulating bridge strips recessed in said slots, and intermediate plates supported at one corner by their respective terminal posts and having at their diagonally opposite corners laterally and downwardly extending projections engaging with the top and inner side edges of one of said bridge strips and downwardly extending projections at the opposite corners engaging with the inner side edge of the other strip.

In testimony whereof we hereunto affix our signatures.

IRVINE M. NOBLE.
WALTER E. GOSSLING.